United States Patent
DeClerk et al.

[11] Patent Number: 5,970,058
[45] Date of Patent: Oct. 19, 1999

[54] METHOD AND APPARATUS FOR FREEING A FRAME TO AID IN HANDOFF DETERMINATION IN A CODE DIVISION MULTIPLE ACCESS COMMUNICATION SYSTEM

[75] Inventors: Daniel J. DeClerk, Algonquin; James P. Ashley, Naperville, both of Ill.

[73] Assignee: Motorola, Inc., Schaumburg, Ill.

[21] Appl. No.: 08/827,942

[22] Filed: Apr. 12, 1997

[51] Int. Cl.[6] ................................ H04J 3/16; H04J 13/02
[52] U.S. Cl. ..................... 370/331; 370/329; 370/335; 370/342; 455/436
[58] Field of Search ..................................... 370/335, 206, 370/331, 342, 329, 280, 277, 278, 428, 528, 433, 435, 470, 471, 472, 476, 477, 468; 455/436, 437, 438, 439, 444

[56] References Cited

U.S. PATENT DOCUMENTS

| | | |
|---|---|---|
| 5,267,261 | 11/1993 | Blakeney, II et al. ............... 455/437 |
| 5,293,643 | 3/1994 | Israelsson ................................ 455/437 |
| 5,327,576 | 7/1994 | Uddenfeldt et al. .................... 455/436 |
| 5,533,014 | 7/1996 | Willars et al. .......................... 370/335 |
| 5,677,908 | 10/1997 | Oura ........................................ 370/331 |

Primary Examiner—Wellington Chin
Assistant Examiner—Steven Nguyen
Attorney, Agent, or Firm—Richard A. Sonnentag

[57] ABSTRACT

A mobile station (106) in a code division multiple access (CDMA) communication system (100) implements scanning of pilot channels on a different frequency by reserving a periodic frame on the forward channel to allow the mobile station (106) to change frequencies and scan for other pilot channels. To preserve some aspects of voice quality, both the base station (102) and mobile station (106) voice encode speech at a maximum of half rate and transmit the information as secondary traffic prior to the frame where the mobile station (106) scans the alternate frequency. To maximize the trade-off between voice quality and frequency of the scan, the base station (102) indicates to the mobile station (106) the period between other frequency scans via messaging. To ensure compatibility, this method can be negotiated via known service configuration negotiation techniques.

13 Claims, 6 Drawing Sheets

METHOD AND APPARATUS FOR FREEING A FRAME TO AID IN HANDOFF DETERMINATION IN A CODE DIVISION MULTIPLE ACCESS COMMUNICATION SYSTEM

FIELD OF THE INVENTION

The present invention relates generally to code division multiple access communication systems, and, more particularly, to the utilization of handoff detection techniques on alternate frequencies in such code division multiple access communication systems.

BACKGROUND OF THE INVENTION

Code Division Multiple Access (CDMA) communication systems are well known. In a CDMA communication system, communication between two communication units (e.g., a central communication site and a mobile communication unit) is accomplished by spreading each transmitted signal over the frequency band of the communication channel with a unique user spreading code. Due to the spreading, transmitted signals are in the same frequency band of the communication channel and are separated only by unique user spreading codes. These unique user spreading codes preferably are orthogonal to one another such that the cross-correlation between the spreading codes is approximately zero. Consequently, when the user spreading codes are orthogonal to one another, the received signal can be correlated with a particular user spreading code such that only the desired user signal (related to the particular spreading code) is despread.

It will be appreciated by those skilled in the art that several different spreading codes exist which can be used to separate data signals from one another in a CDMA communication system. These spreading codes include, but are not limited to, pseudo noise (PN) codes and Walsh codes. A Walsh code corresponds to a single row or column of the Hadamard matrix. For example, in a 64 channel CDMA spread spectrum system, particular mutually orthogonal Walsh codes can be selected from the set of 64 Walsh codes within a 64 by 64 Hadamard matrix. Also, a particular data signal can be separated from the other data signals by using a particular Walsh code to spread the particular data signal.

It will be further appreciated by those skilled in the art that spreading codes can be used to channel code data signals. The data signals are channel coded to improve performance of the communication system, and particularly radiotelephone communication systems, by enabling transmitted signals to better withstand the effects of various radiotelephone channel impairments, such as noise, fading, and jamming. Typically, channel coding reduces the probability of bit error, and/or reduces the required signal to noise ratio usually expressed as bit energy per noise density (Eb/N0), to recover the signal at the cost of expending more bandwidth than would otherwise be necessary to transmit the data signal. For example, Walsh codes can be used to channel code a data signal prior to modulation of the data signal for subsequent transmission. Similarly psuedo-noise (PN) spreading codes can be used to channel code a data signal.

A typical CDMA transmission involves expanding the bandwidth of an information signal, transmitting the expanded signal and recovering the desired information signal by remapping the received spread spectrum into the original information signals bandwidth. This series of bandwidth trades used in CDMA transmission allows the CDMA communication system to deliver a relatively error-free information signal in a noisy signal environment or communication channel. The quality of recovery of the transmitted information signal from the communication channel is measured by the error rate (i.e., the number of errors in the recovery of the transmitted signal over a particular time span or received bit span) for some Eb/N0. As the error rate increases the quality of the signal received by the receiving party decreases. As a result, communication systems typically are designed to limit the error rate to an upper bound or maximum so that the degradation in the quality of the received signal is limited.

In current CDMA communication systems, such as those defined by IS-95A ("Mobile Station-Base Station Compatibility Standard for Dual-Mode Wideband Spread Spectrum Cellular System and published by the Electronic Industries Association (EIA), 2001 Eye Street, N.W., Washington, D.C. 20006) for Digital Cellular Systems (DCS) and ANSI-J-STD-008 for Personal Communication Systems (PCS), the base station and mobile station can connect to each other through multiple radio resources. The method for determining if new CDMA channels are to be added or released is called hand-off detection. Hand-off detection is typically performed on the traffic channel by the mobile station. The mobile station measures the forward (base station to mobile station) pilot channel, and indicates to the base station when conditions permit the addition or deletion of a forward and reverse link to a base station. The base station then allocates resources and assigns the mobile station one or more forward traffic channels via a Hand-off Direction message. In other possible implementations, the base station may perform the handoff detection by instructing the mobile station to transmit at a fixed power level, and simultaneously measures the received power from the mobile station. The base station then measures the signal transmitted from the mobile station to determine if a handoff is required.

Unfortunately, in current CDMA communication systems, there is no efficient way for the mobile station to change frequencies to scan pilot channels nor transmit at fixed power levels on alternate frequencies due to the continuous transmission of the forward traffic channel. Typically, this problem can be avoided by placing identical pilot channels on the same frequency and using the mobile station's same-frequency scanning capability to trigger the hand-off to the other frequency. This method is impractical, however, because it requires the base station to transmit pilot channels on all alternate cells in which the particular frequency covers in order to trigger hand-offs to other frequencies. Another solution is to allow the mobile station to vacate the traffic channel briefly to employ handoff detection techniques on other frequencies. This method, however, introduces gaps in voice coded speech which are discernible by the end-user.

Thus, a need exists for an apparatus and method which overcomes the deficiencies of the prior art.

DETAILED DESCRIPTION OF A PREFERRED EMBODIMENT

Generally stated, a mobile station in a code division multiple access (CDMA) communication system implements handoff detection on a different frequency by reserving a periodic frame on the forward channel to allow the mobile station to change frequencies and scan for other pilot channels. To preserve some aspects of voice quality, both the base station and mobile station voice encode speech at a maximum of half rate, and transmit the information as secondary traffic prior to the frame where the mobile station scans the alternate frequency. To maximize the trade-off between voice quality and frequency of the detection method, the base station indicates to the mobile station the period between other frequency scans via messaging. Alternatively, the base station triggers the detection method by sending a frame containing secondary data a predetermined number of frames prior to the frame when the mobile station changes frequencies to employ the handoff detection algorithm. To ensure compatibility with existing systems which do not implement detection in accordance with the invention, this method may be negotiated via known service configuration negotiation techniques.

Stated more specifically, a method of freeing a frame for aiding in handoff determination in a code division multiple access (CDMA) communication system is disclosed. The CDMA communication system including a mobile station responsive to a base station via a carrier at a first frequency, and determines the frame to be freed to produce a free frame and speech encodes two frames of information at half-rate or less a predetermined number of frames prior to the free frame to produce half-rate speech information for the two frames of information. The system then multiplexes the half-rate or less speech information for the two frames of information into a single frame and channel encodes the half-rate or less speech information within the single frame. The system then transmits the multiplexed and channel encoded half-rate or less speech information for the two frames of information during a transmit frame such that a frame to be previously occupied by one of the two frames of information is freed for aiding in handoff determination.

The step of multiplexing the half-rate or less speech information for the two frames of information into a single frame includes the step of buffering the half-rate speech information for the two frames of information into a single frame. Additionally, the mobile station channel decodes the transmitted channel encoded half-rate speech information for the two frames of information during a time period substantially the same time as a time period of the freed frame. In the preferred embodiment, the frame freed for aiding in handoff determination is utilized by the mobile station to scan for alternate frequencies. The scan for alternate frequencies includes a scan for pilot channels transmitted by alternate base stations at the alternate frequencies. The system then determines the signal strength of the scanned pilot channels. The mobile station transfers the determined signal strength of the scanned pilot channel to aid in handoff determination.

Also in the preferred embodiment, the step of determining the frame to be freed to produce a free frame is either synchronous or asynchronous. If synchronous, the step of determining the frame to be freed to produce a free frame is based upon a hash algorithm having as input the mobile station's Electronic Serial Number (ESN) modulo divided by the number of frames in the period. If asynchronous, the step of determining the frame to be freed to produce a free frame is based upon the mobile station's receipt of a multiplexed half-rate or less frame speech information for the two frames of information. In the preferred embodiment, the mobile station repeats the scan every scan period.

After transmitting the multiplexed and channel encoded half-rate or less speech information for the two frames of information during a transmit frame such that a frame to be previously occupied by one of the two frames of information is freed for aiding in handoff determination, the multiplexed and channel encoded half-rate or less speech information for the two frames of information during the transmit time frame is then received. Channel decoding is then performed on the half-rate or less speech information within the single frame for the two frames of information during a frame subsequent to the transmit frame and speech decoding is performed on the half-rate or less speech information within the single frame for the one frame of information after the frame in which channel decoding occurs. The system then buffers and speech decodes the half-rate or less speech information within the single frame for the other frame of information after the frame in which speech decoding for the one frame of information occurs such that a user receiving such speech decoded half-rate or less speech information perceives no loss in speech continuity.

An apparatus for freeing a frame for aiding in handoff determination in a code division multiple access (CDMA) communication system is also disclosed. The apparatus includes the CDMA communication system including a mobile station responsive to a base station via a carrier at a first frequency and further includes a means for determining the frame to be freed to produce a free frame and a means for speech encoding two frames of information at half-rate or less a predetermined number of frames prior to the free frame to produce half-rate speech information for the two frames of information. The system also includes a means for multiplexing the half-rate or less speech information for the two frames of information into a single frame, a means for channel encoding the half-rate or less speech information within the single frame and a means for transmitting the multiplexed and channel encoded half-rate or less speech information for the two frames of information during a transmit frame such that a frame to be previously occupied by one of the two frames of information is freed for aiding in handoff determination.

Figure 1:
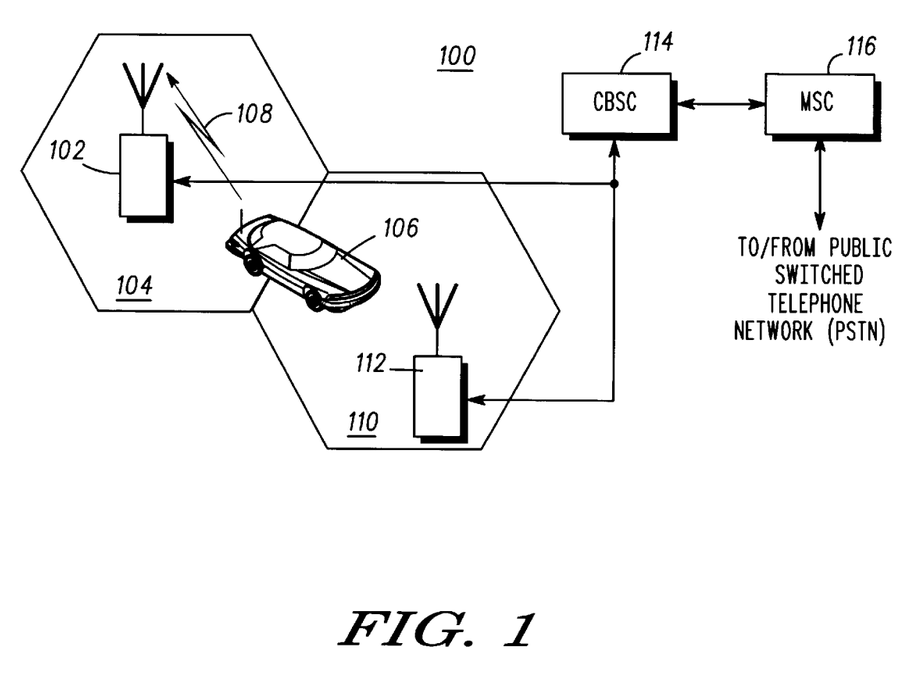
FIG. 1 generally depicts a code division multiple access (CDMA) communication system which may beneficially implement alternate frequency handoff detection in accordance with the invention.

Referring now to FIG. 1, a CDMA communication system 100 which may beneficially employ alternate frequency scanning in accordance with the invention is depicted. The mobile station 106 is located in a first coverage area 104 as is a base station 102. In the preferred embodiment, base station 102 communicates with the mobile station 106 via a digital radio channel 108 which contains data information compatible with a CDMA communication system as defined by IS-95A. The base station 102 negotiates with the mobile station 106 to employ the inventive alternate frequency handoff technique on frequencies supported by base station 112. The mobile station 106 employs the alternate frequency handoff detection technique during the frame which was previously agreed upon between base station 102 and mobile station 106 as will be described below.

Figure 2:
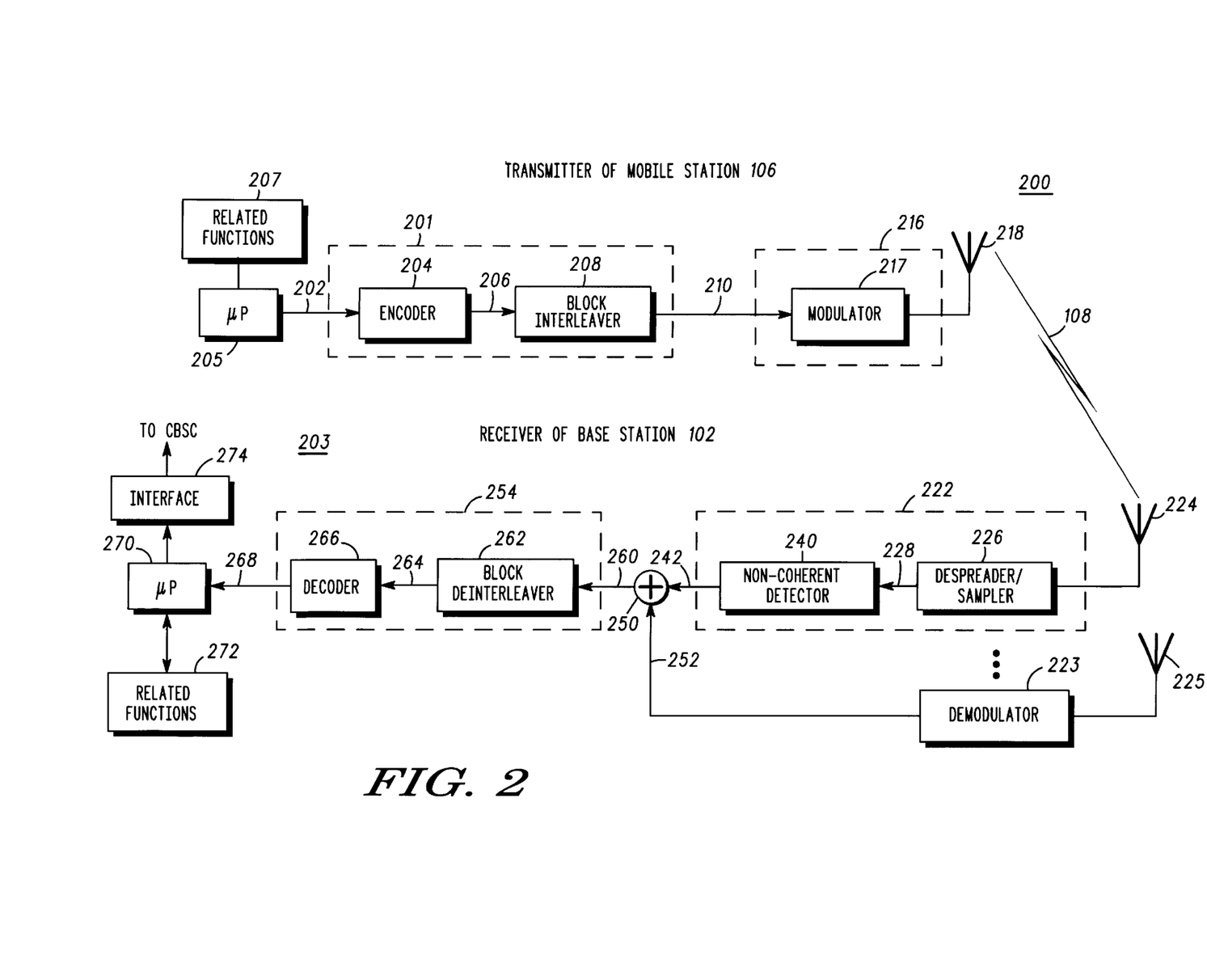
FIG. 2 generally depicts a transmitter of a mobile station in CDMA communication with a receiver of a base station in a manner which may beneficially implement alternate frequency cell scanning in accordance with the invention.

FIG. 2 generally depicts a transmitter 200 of the mobile station 106 in CDMA communication with a receiver 203 of the base station 102 in a manner which may beneficially implement the present invention. In the encoding portion 201, traffic channel data bits 202 originate from a microprocessor ($\mu$P) 205, and are input to an encoder 204 at a particular bit rate (e.g., 1.2 kilobit/second, 2.4 kilobit/second, 4.8 kilobit/second, and 9.6 kilobit/second). The $\mu$P 205 is coupled to a block designated related functions 207, where functions including call processing, link establishment, and other general functions related to establishing and maintaining cellular communication are performed. The traffic channel data bits 202 include voice data as Primary Traffic, optionally voice data as Secondary Traffic, optionally Signaling data or any combination thereof prescribed in IS-95A and/or ANSIJ-STD-008. Encoder 204 encodes the traffic channel data bits 202 into data symbols 206 at a fixed encoding rate (1/r) with an encoding algorithm which facilitates subsequent maximum likelihood decoding of the data symbols into data bits (e.g., convolutional or block coding algorithms). For example, encoder 204 encodes traffic channel data bits 202 (e.g., 192 input data bits that were received at a rate of 4.8 kilobits/second) at a fixed encoding rate of one data bit to three data symbols (i.e., 1/3) such that the encoder 204 outputs data symbols 206 (e.g., 288 data symbols output at a 14.4 kilo symbols/second rate).

The data symbols 206 are then input into a symbol repeater and interleaver 208. Symbol repeater and interleaver 208 repeats the data to increase the effective symbol rate to a 28.8 kilo symbols/second rate, then organizes the data symbols 206 into blocks (i.e., frames) and block interleaves the input data symbols 206 at the symbol level. In the interleaver 208, the data symbols are individually input into a matrix which defines a predetermined size block of data symbols. The data symbols are input into locations within the matrix so that the matrix is filled in a column by column manner. The data symbols are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. The interleaved data symbols 210 are output by the symbol repeater and interleaver 208 at twice the data symbol rate that they were input (e.g., 28.8 kilo symbols/second). The predetermined size of the block of data symbols defined by the matrix is derived from the maximum number of data symbols which can be transmitted at a coded bit rate within a predetermined length transmission block. For example, if data symbols 206 are output from the encoder 204 at a 14.4 kilo symbols/second rate, and if the predetermined length of the transmission block is 20 milliseconds, then the predetermined size of the block of data symbols is 28.8 kilo symbols/second (twice the data rate of data symbols 206 ) times 20 milliseconds (ms) which equals 576 data symbols which defines a 18 by 32 matrix.

The encoded, interleaved data symbols 210 is output from encoding portion 201 of the communication system and input to a transmitting portion 216 of the communication system. The data symbols 210 are prepared for transmission over a communication channel by a modulator 217. Subsequently, the modulated signal is provided to an antenna 218 for transmission over the digital radio channel 108.

The modulator 217 prepares the data symbols 210 for direct sequence code divided spread-spectrum transmission by deriving a sequence of fixed length codes from the encoded, interleaved data symbols 210 in a spreading process. For example, the data symbols within the stream of reference-coded data symbols 210 may be spread to a unique fixed length code such that a group of six data symbols is represented by a single 64 bit length code. The codes representing the group of six data symbols preferably are combined to form a single 64 bit length code. As a result of this spreading process, the modulator 217 which received the encoded, interleaved data symbols 210 at a fixed rate (e.g., 28.8 kilo symbols/second) now has a spread sequence of 64 bit length codes having a higher fixed symbol rate (e.g., 307.2 kilo symbols/second). It will be appreciated by those skilled in the art that the data symbols within the stream of encoded, interleaved data bits 210 may be spread according to numerous other algorithms into a sequence of larger length codes without departing from the scope and spirit of the present invention.

The spread sequence is further prepared for direct sequence code divided spread-spectrum transmission by further spreading the spread sequence with a long spreading code (e.g., PN code). The spreading code is a user specific sequence of symbols or unique user code which is output at a fixed chip rate (e.g., 1.228 Megachips/second). The user code spread encoded data bits (i.e., data symbols) are used to bi-phase modulate a sinusoid by driving the phase controls of the sinusoid. The sinusoid output signal is bandpass filtered, translated to an RF frequency, amplified, filtered and radiated by an antenna 218 to complete transmission of the traffic channel data bits 202 in a digital radio channel 108 with Binary Phase Shift Keyed (BPSK) modulation.

A receiving portion 222 of the base station receiver 203 receives the transmitted spread-spectrum signal from over the digital radio channel 108 through antenna 224. The received signal is sampled into data samples by despreader and sampler 226. Subsequently, the data samples 242 are output to the decoding portion 254 of the communication system.

The despreader and sampler 226 preferably BPSK samples the received spread-spectrum signal by filtering, demodulating, translating from the RF frequencies, and sampling at a predetermined rate (e.g., 1.2288 Megasamples/second). Subsequently, the BPSK sampled signal is despread by correlating the received sampled signals with the long spreading code. The resulting despread sampled signal 228 is sampled at a predetermined rate and output to a non-coherent detector 240 (e.g., 307.2 kilo samples/second so that a sequence of four samples of the received spread-spectrum signal is despread and/or represented by a single data sample) for later non-coherent detection of data samples 242.

As will be appreciated by those skilled in the art, multiple receiving portions 222 through 223 and antennae 224 through 225, respectively, can be used to achieve space diversity. The Nth receiver portion would operate in substantially the same manner to retrieve data samples from the received spread-spectrum signal in digital radio channel 108 as the above described receiving portion 222. The outputs 242 through 252 of the N receiving portions preferably are input to a summer 250 which diversity combines the input data samples into a composite stream of coherently detected data samples 260.

The individual data samples 260 which form soft decision data are then input into a decoding portion 254 including a deinterleaver 262 which deinterleaves the input soft decision data 260 at the individual data level. In the deinterleaver 262, the soft decision data 260 are individually input into a matrix which defines a predetermined size block of soft decision data. The soft decision data are input into locations within the matrix so that the matrix is filled in a row by row manner. The deinterleaved soft decision data 264 are individually output from locations within the matrix so that the matrix is emptied in a column by column manner. The deinterleaved soft decision data 264 are output by the deinterleaver 262 at the same rate that they were input (e.g., 28.8 kilometrics/second).

The predetermined size of the block of soft decision data defined by the matrix is derived from the maximum rate of sampling data samples from the spread-spectrum signal received within the predetermined length transmission block.

The deinterleaved soft decision data 264, are input to a decoder 266 which uses maximum likelihood decoding techniques to generate estimated traffic channel data bits 268. The maximum likelihood decoding techniques may be augmented by using an algorithm which is substantially similar to a Viterbi decoding algorithm. The decoder 266 uses a group of the individual soft decision data 264 to form a set of soft decision transition metrics for use at each particular time state of the maximum likelihood sequence estimation decoder 266. The number of soft decision data 264 in the group used to form each set of soft decision transition metrics corresponds to the number of data symbols 206 at the output of the convolutional encoder 204 generated from each input data bit 202. The number of soft decision transition metrics in each set is equal to two raised to the power of the number of soft decision data 264 in each group. For example, when a 1/3 convolutional encoder is used in the transmitter, three data symbols 106 are generated from each input data bit 202. Thus, decoder 266 uses groups of three individual soft decision data 264 to form eight soft decision transition metrics for use at each time state in the maximum likelihood sequence estimation decoder 266. The estimated traffic channel data bits 268 are generated at a rate related to the rate that the soft decision data 264 are input to the decoder 266 and the fixed rate used to originally encode the input data bits 202 (e.g., if the soft decision data are input at 28.8 kilometrics/second and the original encoding rate was 1/3 then estimated traffic channel data bits 268 are output at a rate of 4800 bits/second).

The estimated traffic channel data bits 268 are input into a $\mu$P 270, which is similar to $\mu$P 207. As in the case of $\mu$P 207, the $\mu$P 270 is coupled to a block designated related functions 272, this block also performing functions including call processing, link establishment, and other general functions related to establishing and maintaining cellular communication. The $\mu$P 270 is also coupled to an interface 274, which allows the receiver 203 of the base station 102 to communicate with the CBSC 114.

Figure 3:
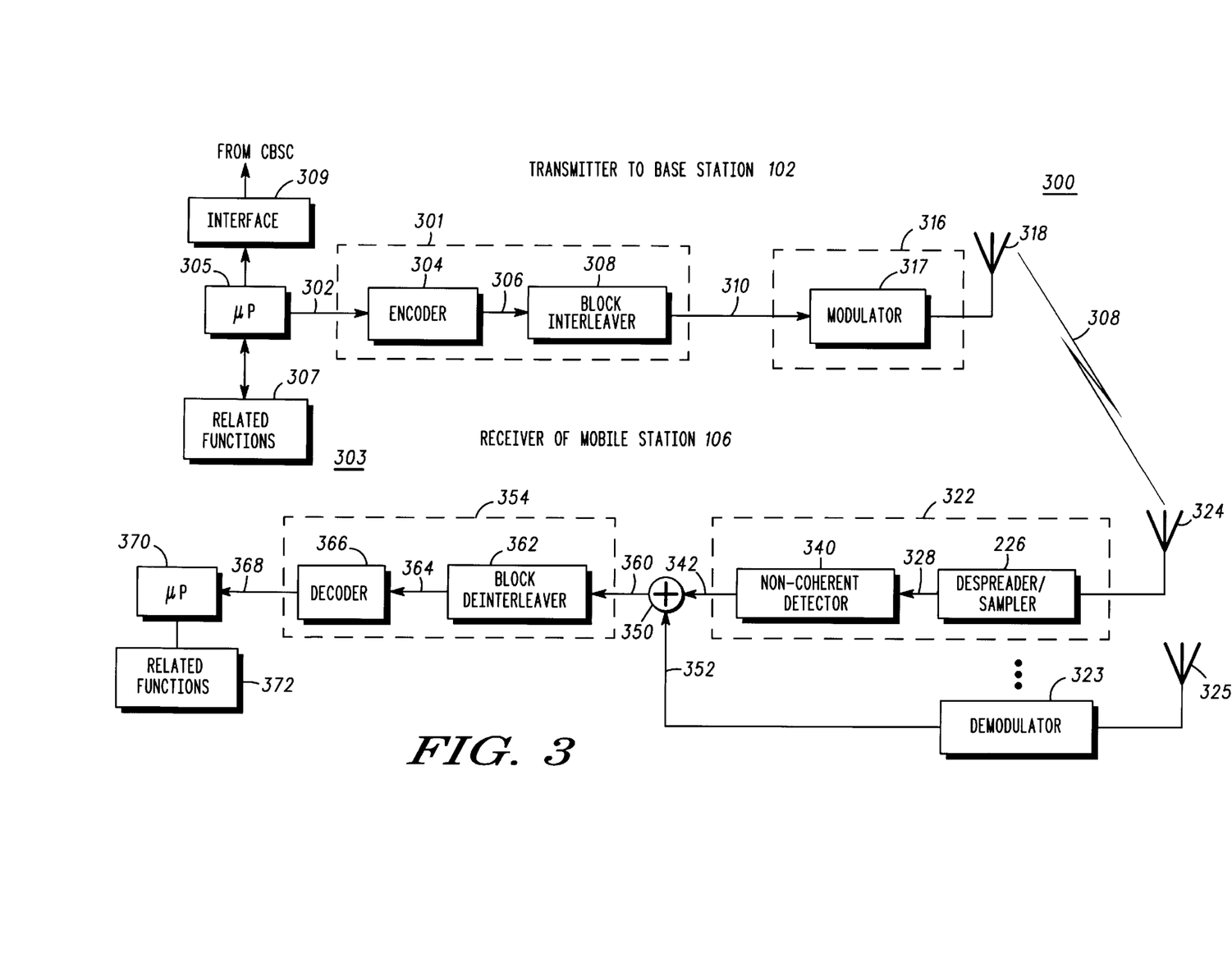
FIG. 3 generally depicts a transmitter of a base station in CDMA communication with a receiver of a mobile station in a manner which may beneficially implement alternate frequency cell scanning in accordance with the invention.

FIG. 3 generally depicts a transmitter 300 of the base station 102 in CDMA communication with a receiver 303 of the mobile station 106 in a manner which may beneficially implement the present invention. In the encoding portion 301 of the communication system, traffic channel data bits 302 are output from a $\mu$P 305, and are input to an encoder 304 at a particular bit rate (e.g., 9.6 kilobit/second). The $\mu$P 305 is coupled to a block designated related functions 307, which performs similar cellular-related functions as blocks 207 and 272 of FIG. 2. The $\mu$P 305 is also coupled to an interface 309 which allows the transmitter 300 of base station 102 to communicate with the CBSC 114.

The broadcast control channel data bits 302 include pure data. Encoder 304 encodes the broadcast control channel data bits 302 into data symbols 306 at a fixed encoding rate (1/r) with an encoding algorithm which facilitates subsequent maximum likelihood decoding of the data symbols into data bits (e.g., convolutional or block coding algorithms). For example, encoder 304 encodes broadcast control channel data bits 302 (e.g., 192 input data bits that were received at a rate of 9.6 kilobits/second) at a fixed encoding rate of one data bit to two data symbols (i.e., 1/2) such that the encoder 304 outputs data symbols 306 (e.g., 384 data symbols output at a 19.2 kilo symbols/second rate).

The data symbols 306 are then input into an interleaver 308. Interleaver 308 organizes the data symbols 306 into blocks (i.e., frames) and block interleaves the input data symbols 306 at the symbol level. In the interleaver 308, the data symbols are individually input into a matrix which defines a predetermined size block of data symbols. The data symbols are input into locations within the matrix so that the matrix is filled in a column by column manner. The data symbols are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. The interleaved data symbols 310 are output by the interleaver 308 at the same data symbol rate that they were input (e.g., 19.2 kilo symbols/second). The predetermined size of the block of data symbols defined by the matrix is derived from the maximum number of data symbols which can be transmitted at a coded bit rate within a predetermined length transmission block. For example, if data symbols 306 are output from the encoder 304 at a 19.2 kilo symbols/second rate, and if the predetermined length of the transmission block is 20 milliseconds, then the predetermined size of the block of data symbols is 19.2 kilo symbols/second times 20 milliseconds (ms) which equals 384 data symbols which defines a 18 by 32 matrix.

The encoded, interleaved data symbols 310 are output from encoding portion 301 of the communication system and input to a transmitting portion 316 of the communication system. The data symbols 310 are prepared for transmission over a communication channel by a modulator 317. Subsequently, the modulated signal is provided to an antenna 318 for transmission over the digital radio channel 108.

The modulator 317 prepares the data symbols 310 for direct sequence code divided spread-spectrum transmission by performing data scrambling on the encoded, interleaved data symbols 310. Data scrambling is accomplished by performing the modulo-2 addition of the interleaver output symbols 310 with the binary value of a long code pseudo-noise PN chip that is valid at the start of the transmission period for that symbol. This pseudo-noise PN sequence is the equivalent of the long code operating at 1.2288 MHz clock rate, where only the first output of every 64 is used for the data scrambling (i.e., at a 19200 sample per second rate).

After scrambling, a sequence of fixed length codes from the scrambled data symbols are derived in a spreading process. For example, each data symbol within the stream of scrambled data symbols may preferably be spread to a unique fixed length code such that each data symbol is represented by a single 64 bit length code. The code representing the data symbol preferably is modulo-2 added to the respective data symbol. As a result of this spreading process, the modulator 317 which received the encoded, interleaved data symbols 310 at a fixed rate (e.g., 19.2 kilo symbols/second) now has a spread sequence of 64 bit length codes having a higher fixed symbol rate (e.g., 1228.8 kilo symbols/second). It will be appreciated by those skilled in the art that the data symbols within the stream of encoded, interleaved data bits 310 may be spread according to numerous other algorithms into a sequence of larger length codes without departing from the scope and spirit of the present invention.

The spread sequence is further prepared for direct sequence code divided spread-spectrum transmission by further spreading the spread sequence with a long spreading code (e.g., PN code). The spreading code is a user specific sequence of symbols or unique user code which is output at a fixed chip rate (e.g., 1.2288 Megachips/second). The user code spread encoded data bits (i.e., data symbols) are used to bi-phase modulate a sinusoid by driving the phase controls of the sinusoid. The sinusoid output signal is bandpass filtered, translated to an RF frequency, amplified, filtered and radiated by an antenna 318 to complete transmission of the traffic channel data bits 302 in a digital radio channel 108 with BPSK modulation.

A receiving portion 322 of the mobile station receiver 303 receives the transmitted spread-spectrum signal from over the digital radio channel 108 through antenna 324. The received signal is sampled into data samples by despreader and sampler 326. Subsequently, the data samples 342 are output to the decoding portion 354 of the communication system.

The despreader and sampler 326 preferably BPSK samples the received spread-spectrum signal by filtering, demodulating, translating from the RF frequencies, and sampling at a predetermined rate (e.g., 1.2288 Megasamples/second). Subsequently, the BPSK sampled signal is despread by correlating the received sampled signals with the long spreading code. The resulting despread sampled signal 328 is sampled at a predetermined rate and output to a non-coherent detector 340 (e.g., 19.2 kilo samples/second so that a sequence of 64 samples of the received spread-spectrum signal is despread and/or represented by a single data sample) for non-coherent detection of data samples 342.

As will be appreciated by those skilled in the art, multiple receiving portions 322 through 323 and antennae 324 through 325, respectively, can be used to achieve space diversity. The Nth receiver portion would operate in substantially the same manner to retrieve data samples from the received spread-spectrum signal in digital radio channel 320 as the above described receiving portion 322. The outputs 342 through 352 of the N receiving portions preferably are input to a summer 350 which diversity combines the input data samples into a composite stream of coherently detected data samples 360.

The individual data samples 360 which form soft decision data are then input into a decoding portion 354 including a deinterleaver 362 which deinterleaves the input soft decision data 360 at the individual data level. In the deinterleaver 362, the soft decision data 360 are individually input into a matrix which defines a predetermined size block of soft decision data. The soft decision data are input into locations within the matrix so that the matrix is filled in a row by row manner. The deinterleaved soft decision data 364 are individually output from locations within the matrix so that the matrix is emptied in a column by column manner. The deinterleaved soft decision data 364 are output by the deinterleaver 362 at the same rate that they were input (e.g., 19.2 kilometrics/second).

The predetermined size of the block of soft decision data defined by the matrix is derived from the maximum rate of sampling data samples from the spread-spectrum signal received within the predetermined length transmission block.

The deinterleaved soft decision data 364, are input to a decoder 366 which uses maximum likelihood decoding techniques to generate estimated broadcast control channel data bits 368. The maximum likelihood decoding techniques may be augmented by using an algorithm which is substantially similar to a Viterbi decoding algorithm. The decoder 366 uses a group of the individual soft decision data 364 to form a set of soft decision transition metrics for use at each particular time state of the maximum likelihood sequence estimation decoder 366. The number of soft decision data 364 in the group used to form each set of soft decision transition metrics corresponds to the number of data symbols 306 at the output of the convolutional encoder 304 generated from each input data bit 302. The number of soft decision transition metrics in each set is equal to two raised to the power of the number of soft decision data 364 in each group. For example, when a 1/2 convolutional encoder is used in the transmitter, two data symbols 306 are generated from each input data bit 302. Thus, decoder 366 uses groups of two individual soft decision data 364 to form four soft decision transition metrics for use at each time state in the maximum likelihood sequence estimation decoder 366. The estimated broadcast control channel data bits 368 are generated at a rate related to the rate that the soft decision data 364 are input to the decoder 366 and the fixed rate used to originally encode the input data bits 302 (e.g., if the soft decision data are input at 19.2 kilometrics/second and the original encoding rate was 1/2 then estimated broadcast control channel data bits 368 are output at a rate of 9600 bits/second). The estimated broadcast control channel data bits 368 are input into a $\mu$P 370 which interprets the estimated broadcast control channel data bits 368 and other fields, including the fields of a digital radio channel assignment, transmitted in the digital radio channel 108. The $\mu$P 370 is coupled to related functions 372 which performs cellular-related functions similar to those performed by blocks 207, 272 and 307.

Figure 4:
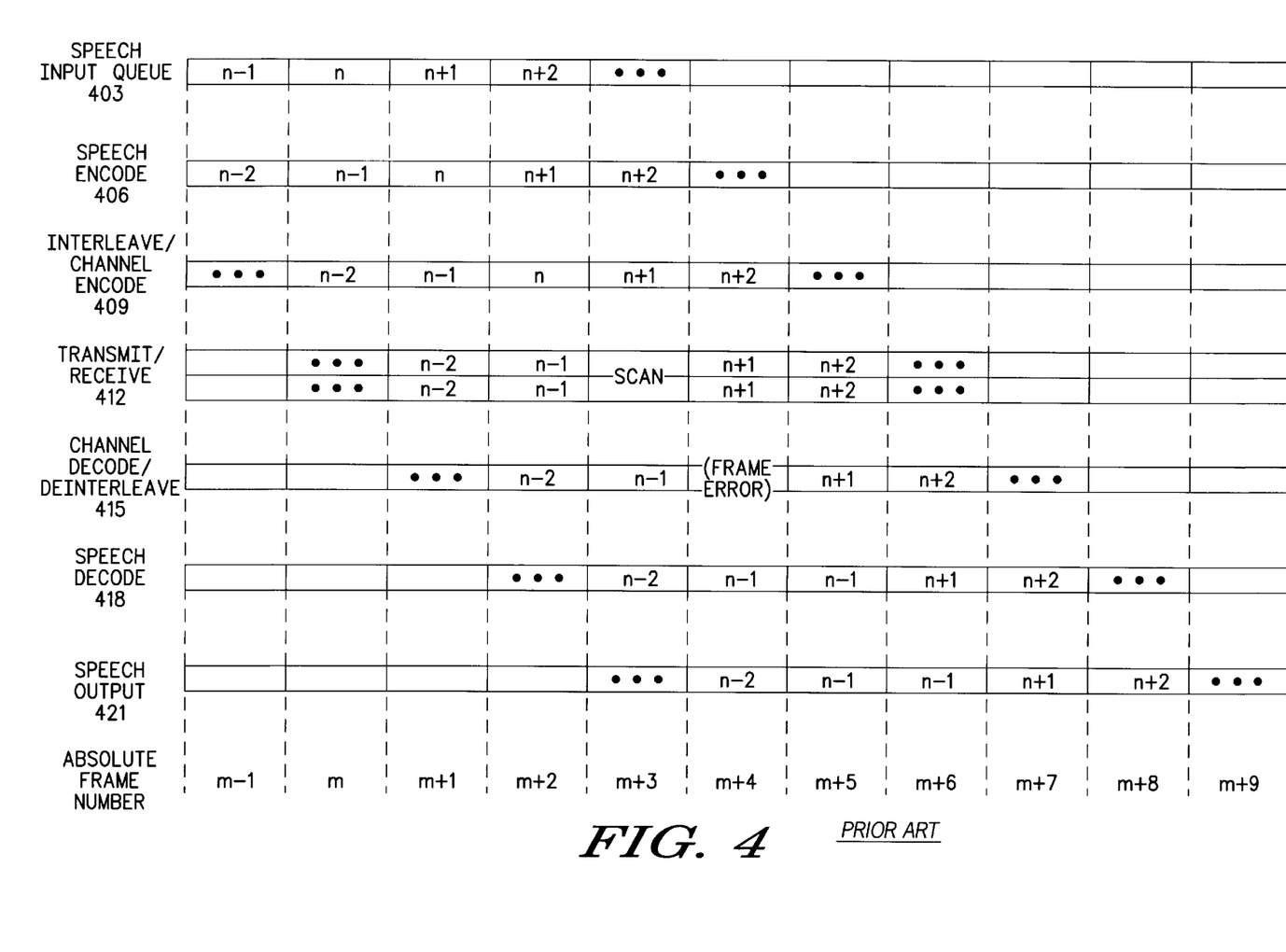
FIG. 4 generally depicts the processing of a prior art mobile station which vacates a traffic channel briefly to implement alternate frequency scanning.

FIG. 4 generally depicts the processing of a prior art mobile station which vacates a traffic channel briefly to implement alternate frequency scanning. As shown in FIG. 4, a frame of information n in a mobile station undergoes certain processing to eventually become encoded speech output to a base station. It should be noted that the relative (n) and absolute (m) timing relationships shown are for illustrative purposes only, and do not necessarily represent an optimal implementation. First, the information n is queued at 403 in a frame m. In the next frame m+1, the information n undergoes speech encoding at 406 and then undergoes channel encoding at 409 in the subsequent frame m+2. At 412, the mobile station transmits the speech/channel encoded information n during frame m+3. At this point, during frame m+3, the mobile station should be receiving information related to n, however since the mobile station is scanning during this time period, no information is received by the mobile station during this time period m+3. As can be seen in the subsequent frame m+4, a frame error occurs where information relative to frame n should have been channel decoded at 415, however, since no information was received, no channel coding at 415 occurs during frame m+4. In response to this, as can be seen during speech decoding 418 and during frame m+5, a complete frame of information (related to n) is missed. As is common in speech coding technology, when a complete frame is missed, the prior frame n−1 is merely repeated.

Instead of creating a discontinuous section of transmitted speech which is done in the prior art as shown in FIG. 4, in accordance with the invention, the transmission of frames n is delayed by 20 milliseconds (1 frame) and the voice coders (vocoders) are forced to implement 1/2 rate coding maximum to free a frame to aid in handoff determination. In the preferred embodiment, the free frame is used to scan for alternate frequencies. During the scan frame, the mobile station is allowed to scan adjacent frequencies to look for strong pilot channels, and the mobile station will transfer this strong pilot channel information to the base station to aid in the handoff process. In the frame prior to the scan frame, the base station and mobile station transmit a maximum of two 1/2 rate frames in a single full-rate frame. The inventive scanning technique broadly described above is best shown in FIG. 5, which generally depicts the preferred embodiment of alternate frequency scanning in a CDMA communication system in accordance with the invention.

Figure 5:
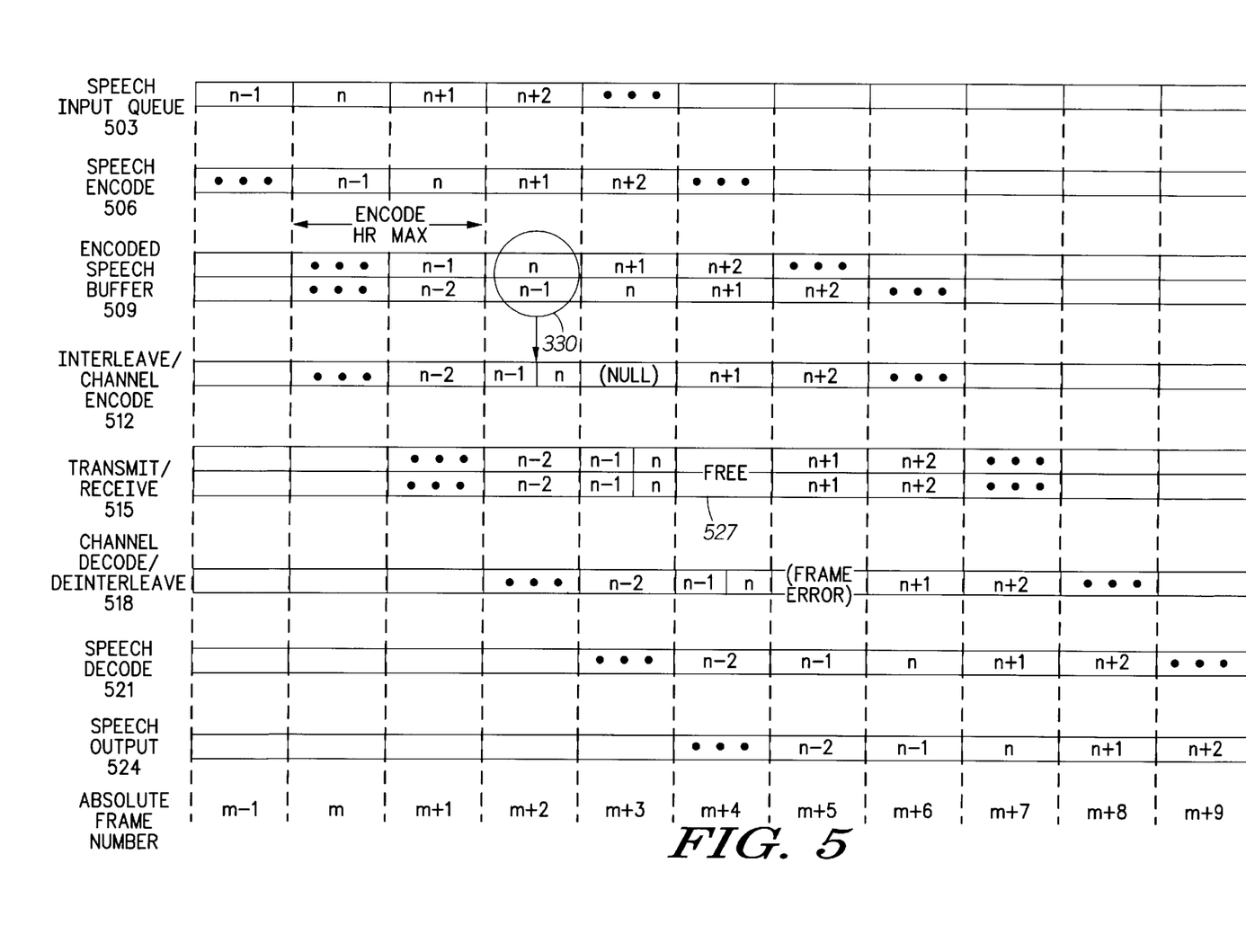
FIG. 5 generally depicts processing of a mobile station which implement alternate frequency scanning in a CDMA communication system in accordance with the invention.

As shown in FIG. 5, the mobile station is shown encoding at 506 speech information at a reduced rate during frames m and m+1 prior to the scan frame 527, and buffers this reduced rate encoded information at 509. In the preferred embodiment, the reduced rate is 1/2 rate coding or less. After buffering, the reduced rate encoded information is multiplexed as shown by circle 530 into a single frame and is then interleaved/channel encoded at 512 into a Primary Traffic field and a Secondary Traffic field during the frame m+2. It should be noted that the Primary Traffic field and the Secondary Traffic field are well known to those familiar with IS-95A. During the next frame m+3, the reduced rate encoded information which was interleaved/channel encoded at 512 into the Primary Traffic field and the Secondary Traffic field is transmitted. By At this point, a receiver (either at the mobile or the base station) would receive at 515 during frame m+3 and in the next frame m+4 decode the Primary Traffic field for use by the speech decoder at 521 in the next frame m+5. The Secondary Traffic field is channel decoded at 518 during frame m+4 and buffered for use during frame m+6. By using the Secondary Traffic field with 1/2 rate encoded data as described above in accordance with the invention, the missing frame generated in the prior art processing shown in FIG. 4 is eliminated and the 1/2 rate frame is perceived to sound better by the user at both ends of the conversation than the missing frame implementation of the prior art.

In the preferred embodiment, the ability of the mobile station to utilize the Primary Traffic field and the Secondary Traffic field may be negotiated using known methods. For example, two such methods capable of implementation are the Service Configuration Negotiation methods described in EIA/TIA TSB-74 or ANSI J-STD-008.

In the preferred embodiment, the number of frames in a scan periods is indicated to the mobile station by the base station. To mitigate the variations in channel noise due to the mobile station switching to other frequencies, the mobile station uses a hash algorithm modulo divided by the number of frames in the frame period to choose which frame within the number of frames in a scan period in which to perform the handoff detection technique. Alternatively, in the preferred embodiment, the mobile station may use the reception of an IS-95 frame containing secondary data to signal that the mobile station is to vacate the traffic channel a predetermined number of frames later to employ the free frame described in accordance with the invention.

Figure 6:
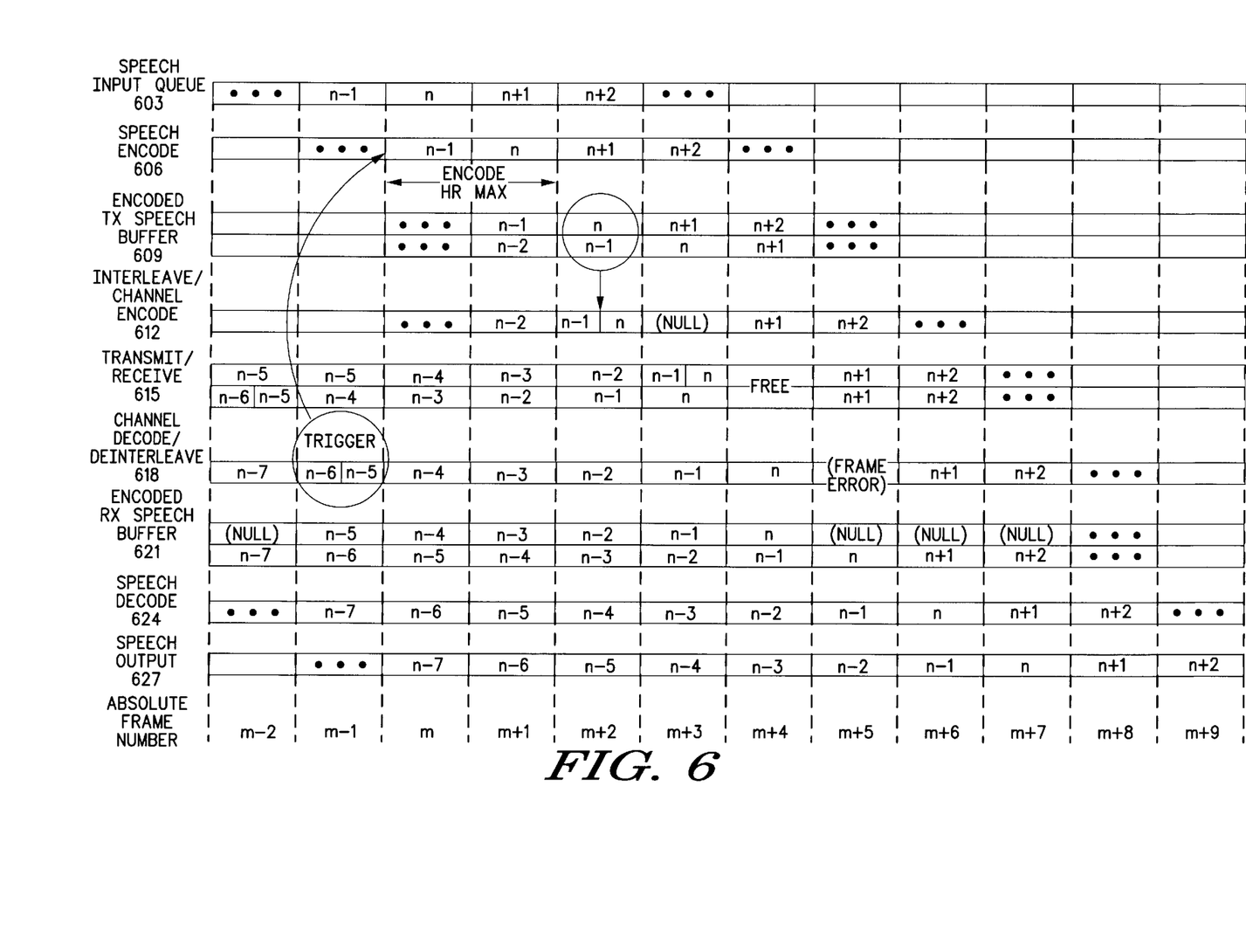
FIG. 6 generally depicts an alternate embodiment of processing of a mobile station which implement alternate frequency scanning in a CDMA communication system in accordance with the invention.

FIG. 6 generally depicts an alternate embodiment which depicts a variation on the preferred embodiment of the invention in which the absolute frame number of the alternate frequency scan does not need to be known a priori. Here, the scan is triggered asynchronously upon the mobile station receiving and channel decoding the Secondary Traffic Channel data associated with the current invention. The advantage to this scenario is that there is increased flexibility in the choice of the scan period. This means that the infrastructure has the ability to optimize the scan period by adaptively estimating the probability of a hard hand-off based on previous alternate pilot scan measurements. The advantage comes by the infrastructure simply modifying the period in an "open-loop" fashion, rather than communicating the period to the mobile station ("closed-loop") if a change is desired. The latter method can further degrade voice quality by increasing signaling traffic and forcing the vocoder to "dim-and-burst" more frequently.

Referring again to FIG. 6, when the Secondary Traffic Channel data is channel decoded at frame m−1, a trigger is generated which forces the mobile station speech encoder to encode the next two speech frames at Rate 1/2 or lower. In addition, the received encoded speech packets (for relative time frames n−6 and n−5) are double-buffered to allow the additional speech packet to be decoded during the time when a packet is lost due to alternate frequency scanning, which is performed some time later (at frame m+4).

Once the two Rate 1/2 or lower frames are speech encoded and double-buffered (at frame m+2), they are multiplexed into a Primary and Secondary Traffic frame in accordance with the invention. This frame is then channel encoded and presented to the air interface at frame m+3. At this time, both the transmit and receive data paths (reverse and forward traffic, respectively) have buffers which contain an extra frame of encoded speech data, thereby allowing the alternate frequency scan to be performed without loss or repetition of encoded speech data to the speech decoders at both the mobile station and the infrastructure.

This method differs from the preferred embodiment in that the exact frame at which the alternate frequency scanning is performed is not determined until the valid reception of the Secondary Traffic data by the mobile station.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What we claim is:

1. A method of freeing a frame for aiding in handoff determination in a code division multiple access (CDMA) communication system, the CDMA communication system including a mobile station responsive to a base station via a carrier at a first frequency, the method comprising the steps of:

determining the frame to be freed to produce a free frame;

speech encoding two frames of information at half-rate or less a predetermined number of frames prior to the free frame to produce half-rate speech information for the two frames of information;

multiplexing the half-rate or less speech information for the two frames of information into a single frame;

channel encoding the half-rate or less speech information within the single frame; and transmitting the multiplexed and channel encoded half-rate or less speech information for the two frames of information during a transmit frame such that a frame to be previously occupied by one of the two frames of information is freed for aiding in handoff determination.

2. The method of claim 1, wherein the step of multiplexing the half-rate or less speech information for the two frames of information into a single frame further comprises the step of buffering the half-rate speech information for the two frames of information into a single frame.

3. The method of claim 1, wherein the mobile station channel decodes the transmitted channel encoded half-rate speech information for the two frames of information during a time period substantially the same time as a time period of the freed frame.

4. The method of claim 1, wherein the frame freed for aiding in handoff determination is utilized by the mobile station to scan for alternate frequencies.

5. The method of claim 4, wherein the scan for alternate frequencies further comprises a scan for pilot channels transmitted by alternate base stations at the alternate frequencies.

6. The method of claim 5, wherein the scan for pilot channels further comprises a determination of the signal strength of the scanned pilot channels.

7. The method of claim 6, wherein the mobile station transfers the determined signal strength of the scanned pilot channel to aid in handoff determination.

8. The method of claim 1, wherein the step of determining the frame to be freed to produce a free frame is either synchronous or asynchronous.

9. The method of claim 8, wherein the step of determining the frame to be freed to produce a free frame when synchronous is based upon a hash algorithm having as input the mobile station's Electronic Serial Number (ESN) modulo divided by the number of frames in the period.

10. The method of claim 8, wherein the step of determining the frame to be freed to produce a free frame when asynchronous is based upon the mobile station's receipt of a multiplexed half-rate or less frame speech information for the two frames of information.

11. The method of claim 4, wherein the mobile station repeats the scan every scan period.

12. The method of claim 1, further comprising the steps of:

receiving the multiplexed and channel encoded half-rate or less speech information for the two frames of information during the transmit time frame;

channel decoding the half-rate or less speech information within the single frame for the two frames of information during a frame subsequent to the transmit frame;

speech decoding the half-rate or less speech information within the single frame for the one frame of information after the frame in which channel decoding occurs;

buffering and speech decoding the half-rate or less speech information within the single frame for the other frame of information after the frame in which speech decoding for the one frame of information occurs such that a user receiving such speech decoded half-rate or less speech information perceives no loss in speech continuity.

13. An apparatus for freeing a frame for aiding in handoff determination in a code division multiple access (CDMA) communication system, the CDMA communication system including a mobile station responsive to a base station via a carrier at a first frequency, the apparatus comprising:

means for determining the frame to be freed to produce a free frame;

means for speech encoding two frames of information at half-rate or less a predetermined number of frames prior to the free frame to produce half-rate speech information for the two frames of information;

means for multiplexing the half-rate or less speech information for the two frames of information into a single frame;

means for channel encoding the half-rate or less speech information within the single frame; and means for transmitting the multiplexed and channel encoded half-rate or less speech information for the two frames of information during a transmit frame such that a frame to be previously occupied by one of the two frames of information is freed for aiding in handoff determination.

* * * * *

UNITED STATES PATENT AND TRADEMARK OFFICE
CERTIFICATE OF CORRECTION

PATENT NO  :   5,970,058
DATED      :   October 19, 1999
INVENTOR(S):   DeClerck, et al.

It is certified that error appears in the above-identified patent and that said Letters Patent are hereby corrected as shown below:

On the title page, item

[75] Inventors: reads "Daniel J. DeClerk" and it should read –Daniel J DeClerck--.

Signed and Sealed this

Twenty-fourth Day of October, 2000

Attest:

Q. TODD DICKINSON

Attesting Officer          Director of Patents and Trademarks